(12) United States Patent
Hsieh

(10) Patent No.: US 7,123,353 B2
(45) Date of Patent: Oct. 17, 2006

(54) METHOD FOR MONITORING SLOPE LANDS AND BUILDINGS ON THE SLOPE LANDS

(76) Inventor: Tsung-Jung Hsieh, 6F., No. 82, Lane16, Xianyan Rd., Wenshan District, Taipei City (TW)

( * ) Notice: Subject to any disclaimer, the term of this patent is extended or adjusted under 35 U.S.C. 154(b) by 340 days.

(21) Appl. No.: 10/840,227

(22) Filed: May 7, 2004

(65) Prior Publication Data

US 2005/0248753 A1    Nov. 10, 2005

(51) Int. Cl.
*G01B 11/26* (2006.01)
*G01C 1/00* (2006.01)

(52) U.S. Cl. .................................... 356/138; 356/139.1
(58) Field of Classification Search ................ None
See application file for complete search history.

(56) References Cited

U.S. PATENT DOCUMENTS 4,171,907 A * 10/1979 Hill et al. ................. 356/5.11
5,022,763 A * 6/1991 Vuagnat ...................... 356/400
5,055,666 A * 10/1991 Miyahara .................. 250/206.1
5,486,690 A * 1/1996 Ake ......................... 250/206.1
5,898,490 A * 4/1999 Ohtomo et al. ........... 356/141.3
6,037,874 A * 3/2000 Heironimus ............. 340/686.1

FOREIGN PATENT DOCUMENTS

JP      7-198337      * 8/1995
JP      2003-315114   * 11/2003

* cited by examiner

*Primary Examiner*—Michael P. Stafira
(74) *Attorney, Agent, or Firm*—Birch, Stewart, Kolasch & Birch, LLP (57) ABSTRACT

A method for monitoring slope lands and buildings on the slope lands includes installing a light transceiver on a slope land and a light emission device on a location or a building corresponding to the light transceiver. When light emitted from the light emission device is received by the light transceiver, the light transceiver does not output signals. The light transceiver does not receive the light emitted from the light emission device when the dislocation or inclination occurs to the slope land and the light transceiver outputs a signal to alert a monitor center.

10 Claims, 12 Drawing Sheets

METHOD FOR MONITORING SLOPE LANDS AND BUILDINGS ON THE SLOPE LANDS

FIELD OF THE INVENTION

The present invention relates to a method for monitoring slope lands and buildings on the slope lands and particularly to method to detect and monitor sliding or toppling of a slope land retaining structure or buildings on the slope lands.

BACKGROUND OF THE INVENTION

In recent years many slope lands have been relentlessly cultivated or developed and result in the soils of the slope lands cannot withstand a great amount rainwater seeping into the earth. Consequently the slope lands often crumple to form landslides that become a great threat or cause great damages to people living in the slope land area.

One of the measures to protect people living in the slope area is to construct retaining structure on the slope land. The conventional retaining structure usually is built in the form of embankment. Because of geographic and space constraints, the retaining structure often is constructed by a half-excavation and half-filling approach. And it generally is a man-made platform or construction space. These days many buildings are located on the slope land or below the slope land. Hence the slope land retaining structure becomes very important. A lot of slope land damage cases indicate that prior to the damage occur or pending to occur, many unstable symptoms such as small or obvious inclination or dislocations or cracking take place. However due to the present regulations do not have mandatory decree or budget constraint, no monitor systems or continuous monitoring have been established for those unstable slope lands. As a result, crumpling or dislocation of the slope land often aggravates and finally inflicts a great damage or disaster.

Therefore to establish a safety monitor structure or system for the community on the slope land area is an urgent issue.

Figure 1:
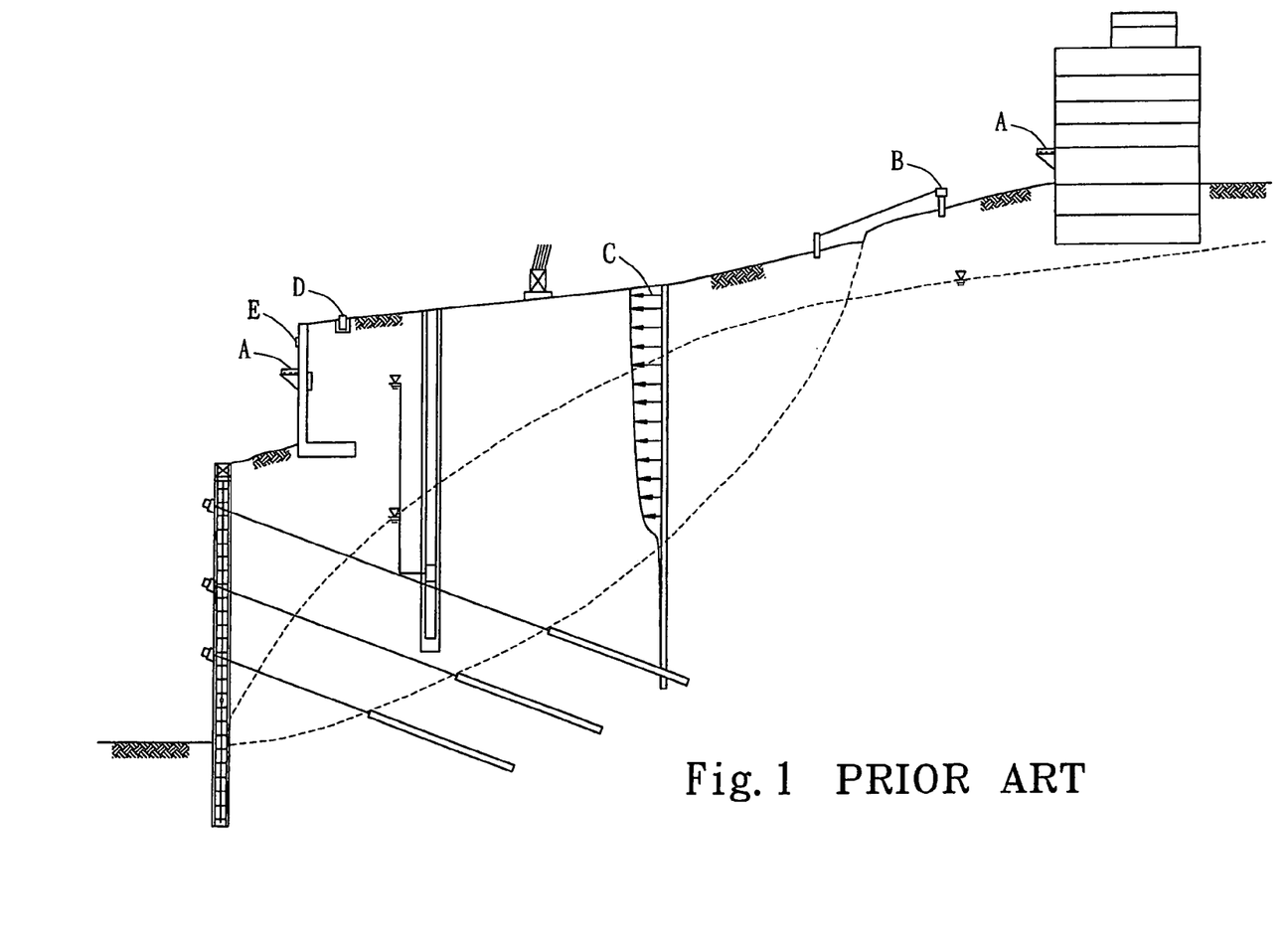
FIG. 1 is a schematic view of a conventional slope land monitoring system.

To ensure the stability of the slope land retaining structure, besides giving additional reinforcement to the retaining structure, setting up a monitor apparatus on the slope land retaining structure to monitor the slope land condition also is important. FIG. 1 illustrates a conventional monitor system for such purpose. It includes a building gradient tray A, a landslide meter B, a gradient observation duct C, a sinking observation spot D, and a crevice meter E. While the monitor devices mentioned above can monitor the slope land conditions, they are very expensive. To install those equipment on the slope land retaining structure also is costly and time-consuming.

SUMMARY OF THE INVENTION

The primary object of the present invention is to solve the aforesaid disadvantages. The invention includes simple equipment that may be simply installed or mounted on a slope land retaining structure or a building at a lower cost, and can monitor the dislocation or inclination status occurred to the slope land retaining structure or building for a long period of time, and in the event of dislocation and inclination occurs to the slope land retaining structure or building, a pre-warning alarm will be generated.

In order to achieve the foregoing object, the method for detecting slope lands and buildings on the slope lands according to the invention includes a light emission device installed on a slope land or a building and a light transceiver installed on a location corresponding to the light emission device. When light projects from the light emission device is received by the light transceiver, the light transceiver does not output signals. In the event that dislocation or inclination occurs to the slope land retaining structure or building, and the light transceiver does not receive the light emitted from the light emission device, the light transceiver immediately outputs a signal to a monitor center.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 2:
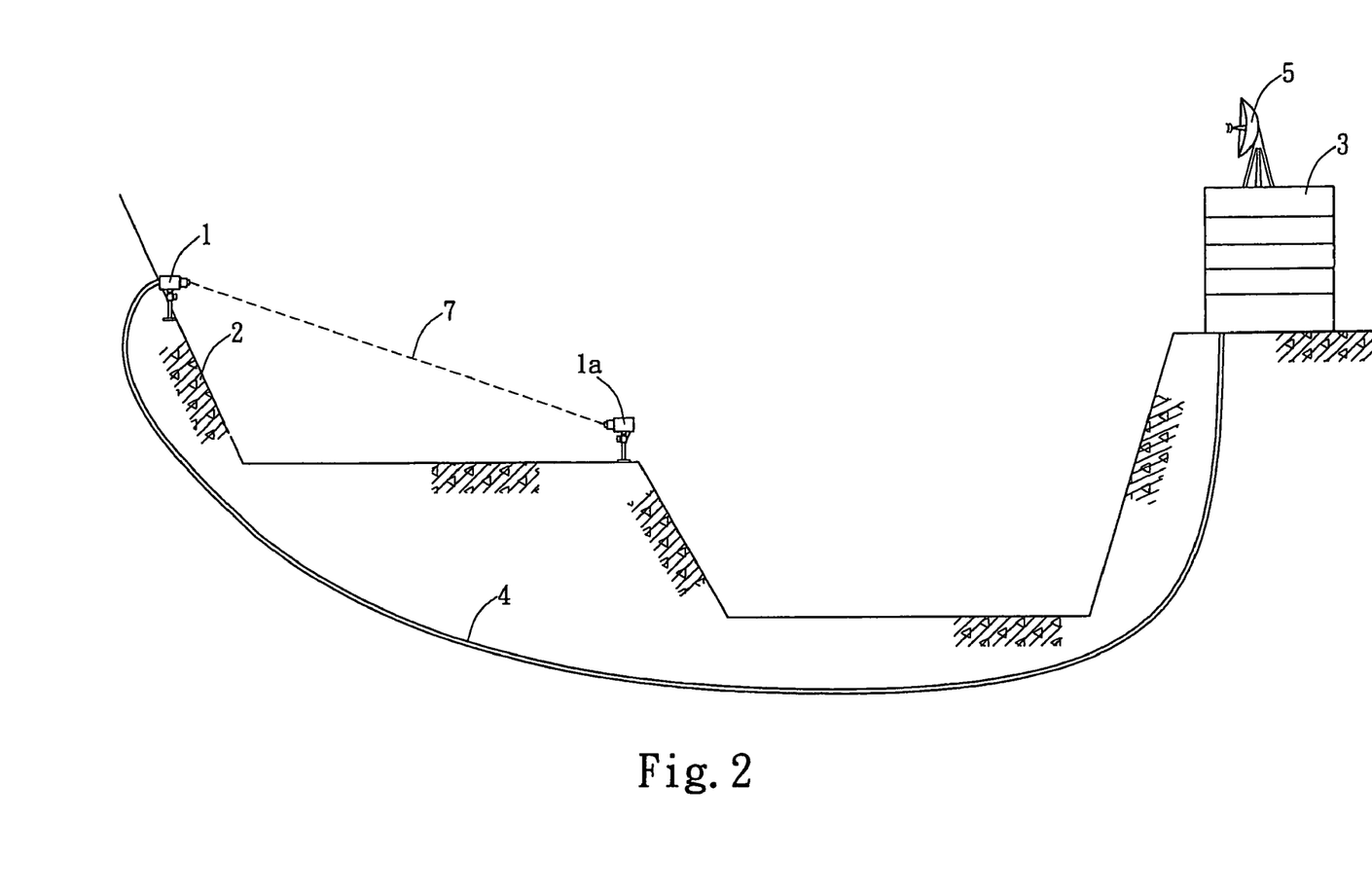
FIG. 2 is a schematic view of a first embodiment of the present invention.

Please refer to FIG. 2 for a first embodiment of the present invention, The method for monitoring slope lands and buildings on slope lands according to the invention mainly includes installing simple equipment on a slope land or a building on the slope land to monitor whether dislocation occurs to the slope land or the building on the slope land to ensure that its safe for living or passing, and also to reduce the cost of the monitoring equipment and facilitate installation.

Figure 3:
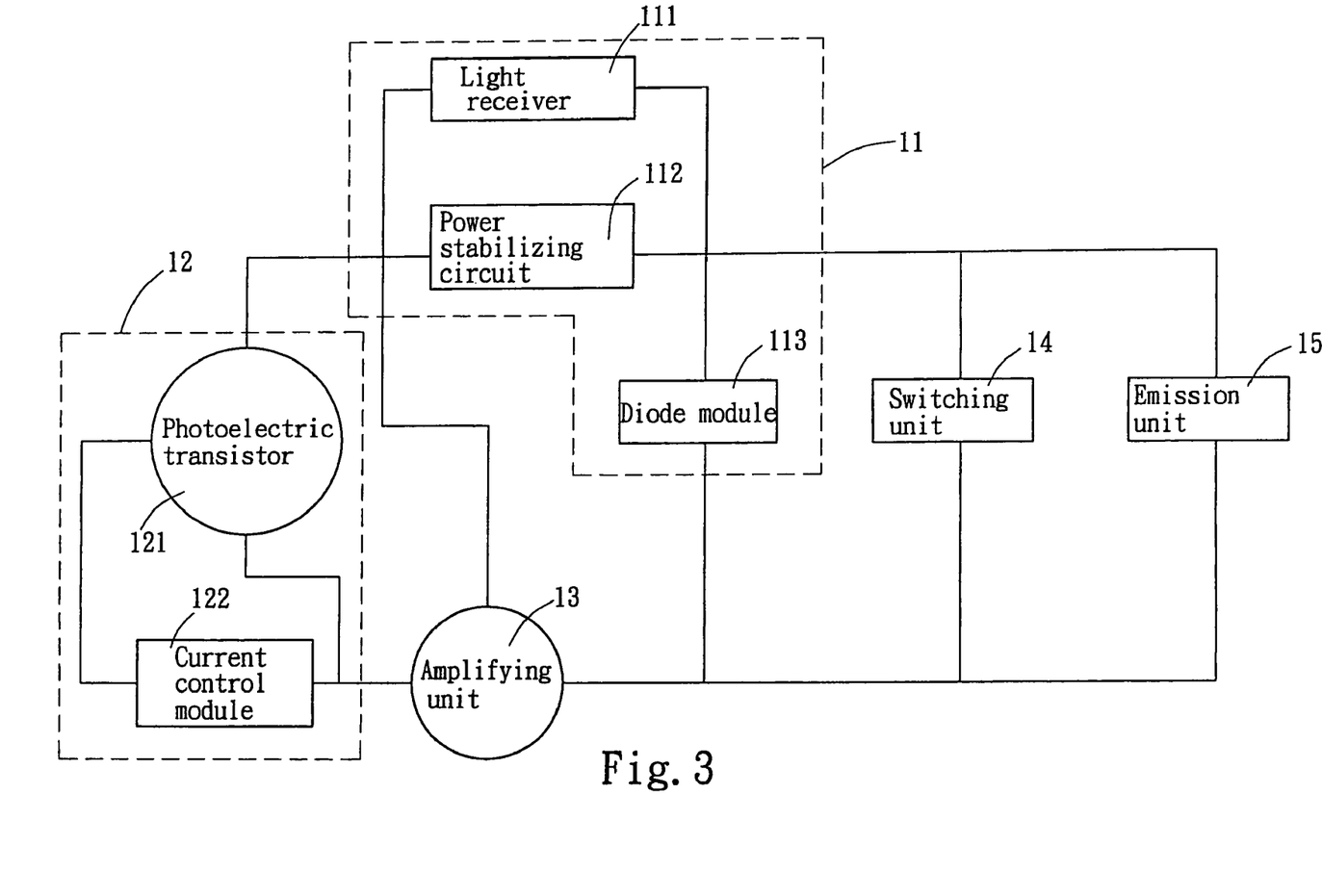
FIG. 3 is a circuit block diagram of the present invention for the light transceiver that receives and emits light.
Figure 4:
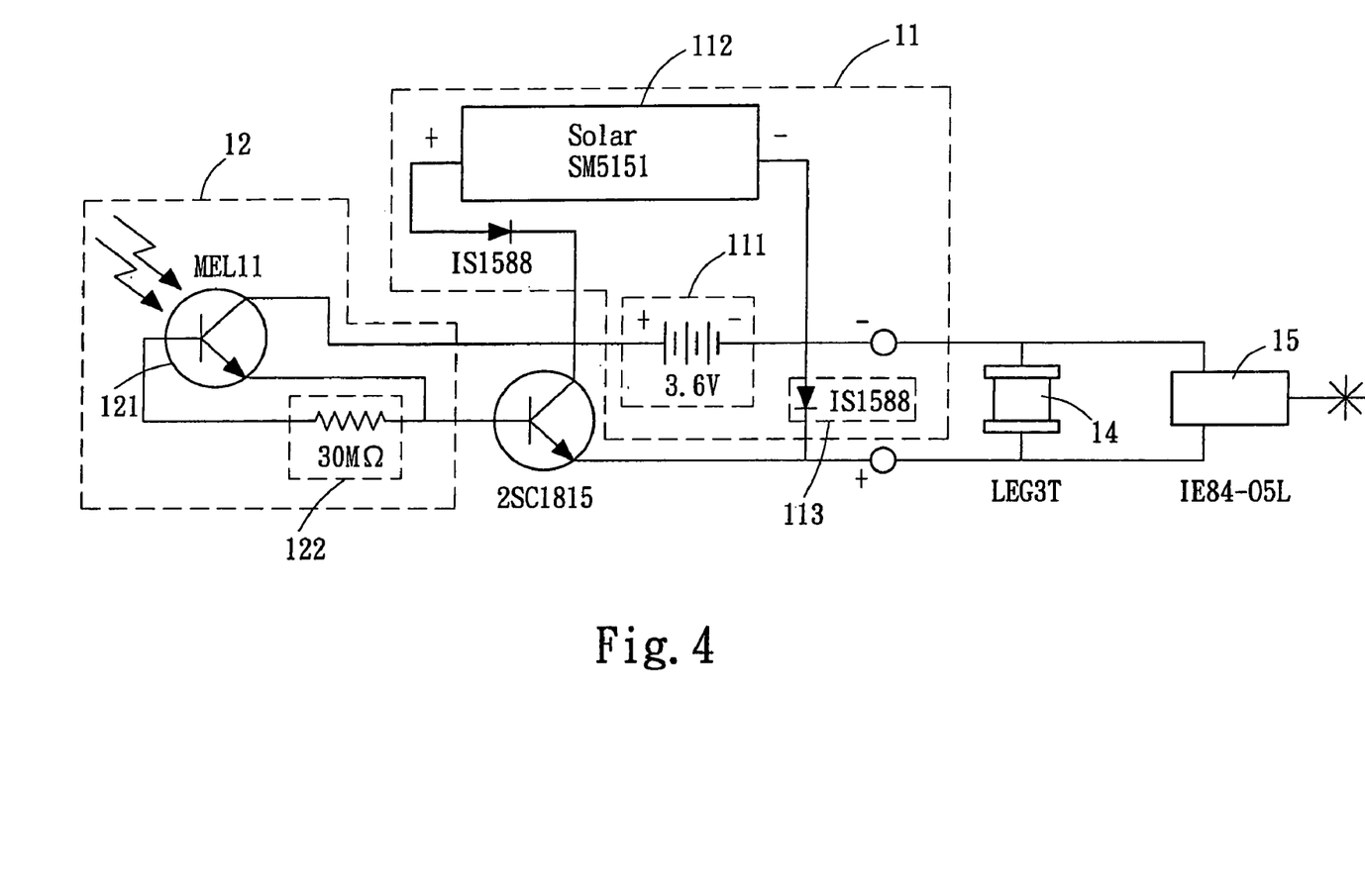
FIG. 4 is a circuit diagram for FIG. 3.

The equipment includes a light transceiver 1 for receiving and emitting light and a light emission device 1a. Referring to FIGS. 3 and 4, they include a power unit 11, a receiving unit 12, an amplifying unit 13, a switching unit 14 and an emission unit 15.

The power unit 11 includes a light receiver 111, a power stabilizing circuit 112 and a diode module 113. The light receiver 111 may be a solar energy power supply control module to receive sun light and convert to electric power to output. The electric power is stabilized by the power stabilizing circuit 112 and becomes the power supply for the entire equipment.

The receiving unit 12 includes a photoelectric transistor 121 and a current control module 122 to receive light projected from an external source and convert to electric current to output. The current is controlled by the current control module 122.

The amplification unit 13 includes a transistor to amplify the electric current output from the receiving unit 12.

The switching unit 14 is a relay control module which does not output any signal when the receiving unit 12 has received light emitted from the light emission device 1a. In such a condition, the switching unit 14 is at a cutoff status. In the event that the receiving unit 12 does not receive the light, a signal is output to actuate the switching unit 14 to a conductive status, and another signal is output to an external monitor center, or telephone is dialed automatically, or an audio alarm is activated.

The emission unit 15 can generate an output light. It may be a laser signal emission control module.

Referring to FIG. 2, the light transceiver 1 may be adopted on the receiving portion previously discussed, while the light emission device 1*a* may be adopted on the light generating portion mentioned above.

When the light emission device 1*a* is in use, the power unit 11 receives solar energy and converts to electric power; the emission unit 15 is activated to generate output light; the light transceiver 1 actuates the switching unit 14 to become conductive after the receiving unit 12 has received the light projected from the light emission device 1*a*; the switching unit 14 outputs a signal to the monitor center to confirm that light has been received emitted from the light emission device 1*a*. In the event that the receiving unit 12 of the light transceiver 1 does not receive the light projected from the light emission device 1*a*, the switching unit 14 is cut off and does not output any signal. Hence the monitor center does not receive the signal. Such a condition indicates that an abnormal condition has happened to the light projecting location or the light receiving location. Therefore a double monitoring function may be achieved.

Figure 5A:
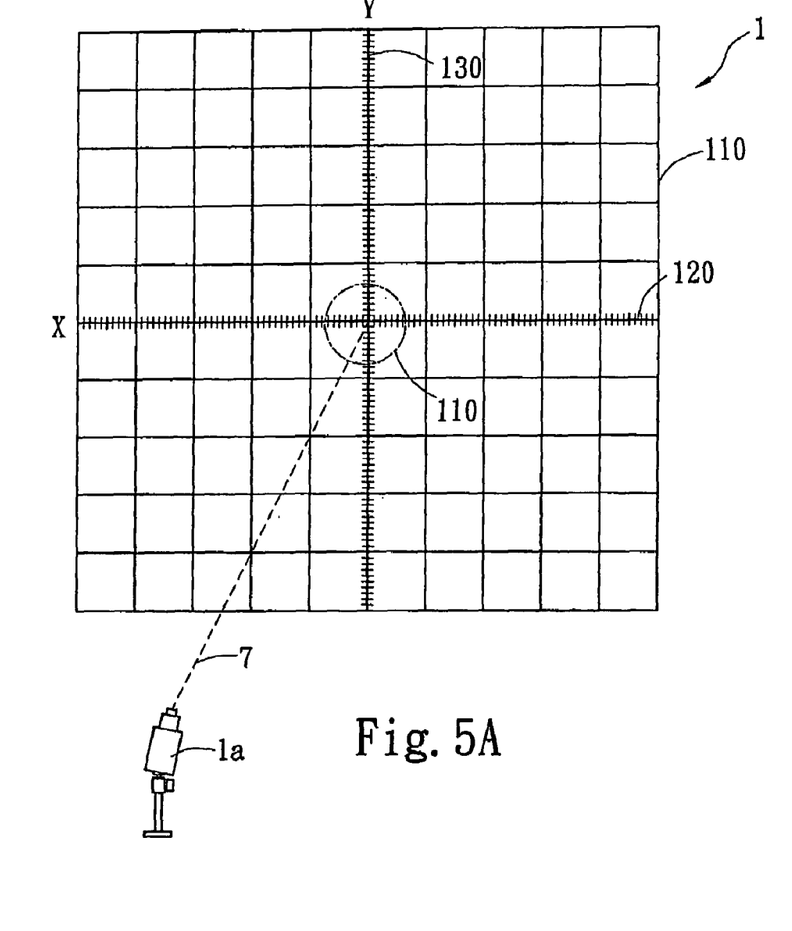
FIGS. 5A and 5B are plain and fragmentary enlarged views of the face panel of present invention.
Figure 5B:
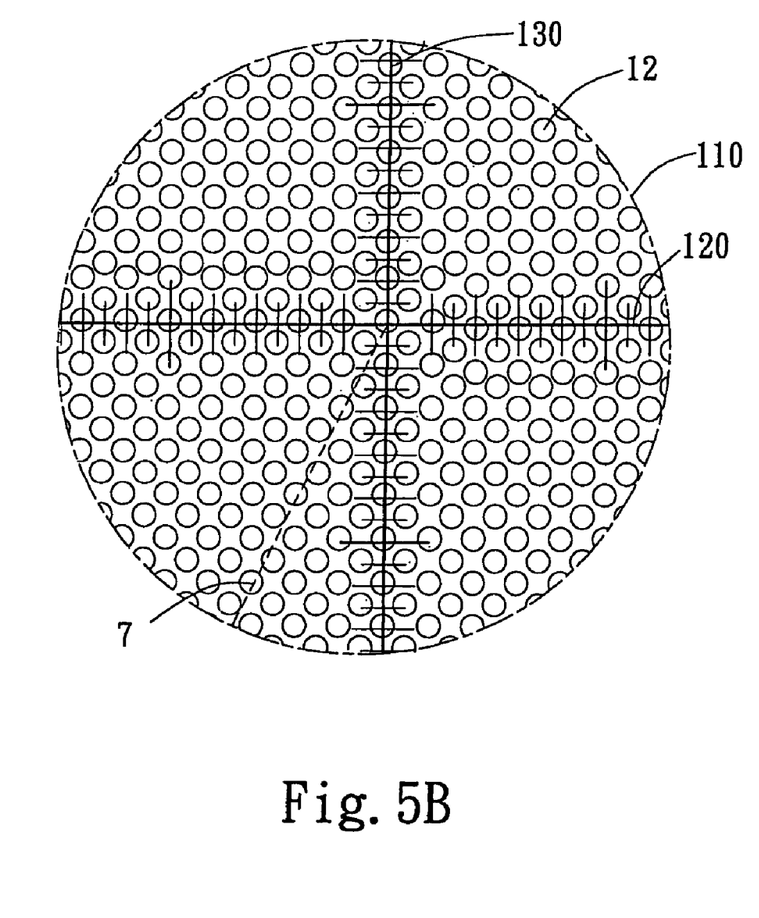

Referring to FIGS. 5A and 5B, the light transceiver 1 may includes a face panel 110 which has a transverse coordinate axis (x axis) 120 and a longitudinal coordinate axis (y axis) 130. A plurality of light receiving units 12 may be located thereon in a matrix manner. Each light receiving unit 12 indicates a coordinate spot (longitude, latitude).

After the light emission device 1*a* has emitted light, the light directly projects to the face panel 110 on the crossing spot of the transverse coordinate axis (x axis) 120 and the longitudinal coordinate axis (y axis) 130. In the event that dislocation or inclination occurs to the slope land or the building on the slope land, the light 7 emitted from the light emission device 1*a* moves and projects to the face plate 110 on a different coordinate spot. The receiving unit 12 of the face plate 110 will transmit the received signal to the monitor center to alert the current condition of the slope land and the building on the slope land.

During monitoring, the light transceiver 1 is located on a slope land 2. The light emission device 1*a* is installed on another location corresponding to the light transceiver 1. The relay control module located in the light transceiver 1 is connected to an external signal transmission line, or transmits by radio. The light emission device 1*a* has a light signal emission control module located therein to emit and project the light 7 to the light transceiver 1 that is received by the photoelectric transistor located therein. At that moment, the relay control module in the light transceiver 1 is at the cutoff status and does not output any signal. In the event that dislocation occurs to the slope land 2, and the light transceiver 1 does not receive the light 7 from the light emission device 1*a*, the relay control module is actuated and becomes conductive, and a signal is transmitted to the monitor center 3. The signal may be transmitted through a transmission line 4 or a receiving end 5 to the monitor center 3. People in the monitor center 3 can immediately alert related organizations to proceed rescue operation or inform people living in the affected area to evacuate so that their lives and properties may be saved.

Figure 6:
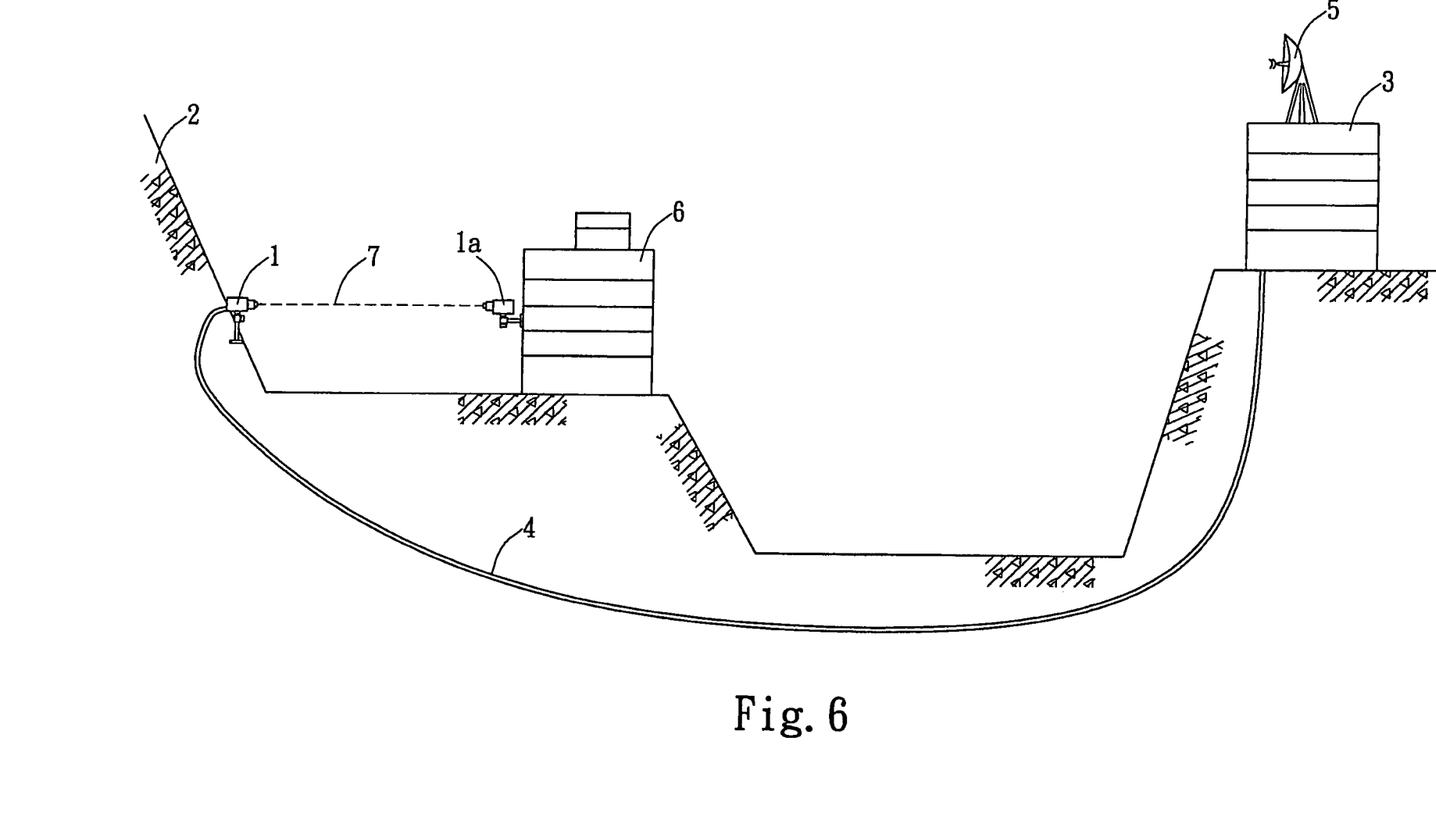
FIG. 6 is a schematic view of a second embodiment of the present invention.

Refer to FIG. 6 for a second embodiment of the invention. It is largely like the embodiment shown in FIG. 2. The difference is that the light emission device 1*a* is installed on a building 6 on the slope land 2. The light 7 generated by the light emission device 1*a* projects to the light transceiver 1. The relay control module in the light transceiver 1 is at the cutoff status and does not output any signal. When dislocation or inclination occurs to the building 6 and results in the light transceiver 1 cannot receive the light projected from the light emission device 1*a*, the relay control module becomes conductive and sends a signal to the monitor center 3. Then the monitor center 3 can immediately inform related organizations and residents to evacuate.

Figure 7:
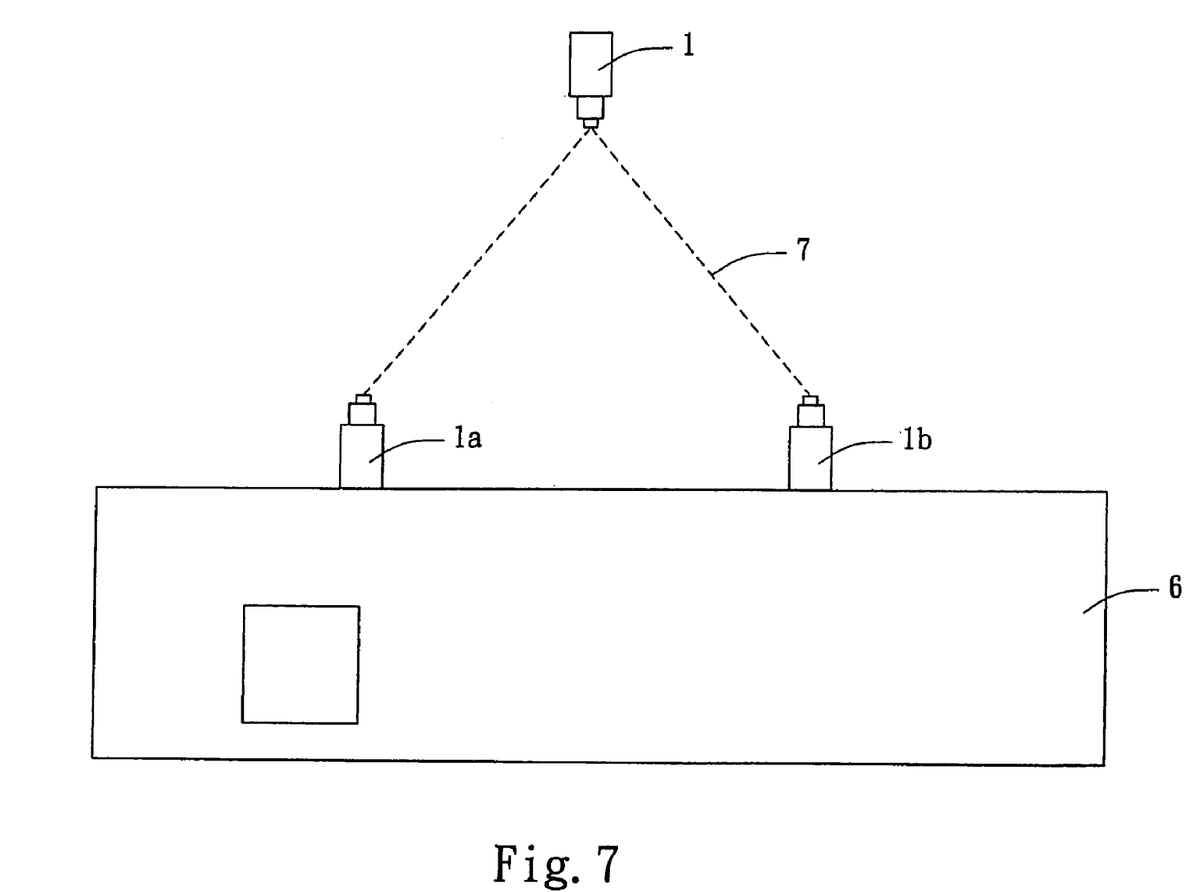
FIG. 7 is a schematic view of a third embodiment of the present invention.

Refer to FIG. 7 for a third embodiment of the invention. In this embodiment the building 6 has installed one or more additional light emission device 1*b* to generate light 7 and project directly to the light transceiver 1. Such type of configuration can prevent the light 7 traveled between the light transceiver 1 and the light emission device 1*a* from being blocked and interrupted by people, animals or articles and resulting in actuating the relay control module in the light transceiver 1 to become conductive, and transmitting a signal to the monitor center 3 mistakenly and causing a false alarm.

Hence the additional light emission device 1*b* is being installed to communicate with the light transceiver 1. Thus in the event that the light 7 traveled between the first light emission device 1*a* and the light transceiver 1 is interrupted, the monitor center 3 still can check the additional light emission device 1*b* to determine the actual condition of the interruption between the first light emission device 1*a* and the light transceiver 1 to avoid unnecessary false alarm.

Figure 8:
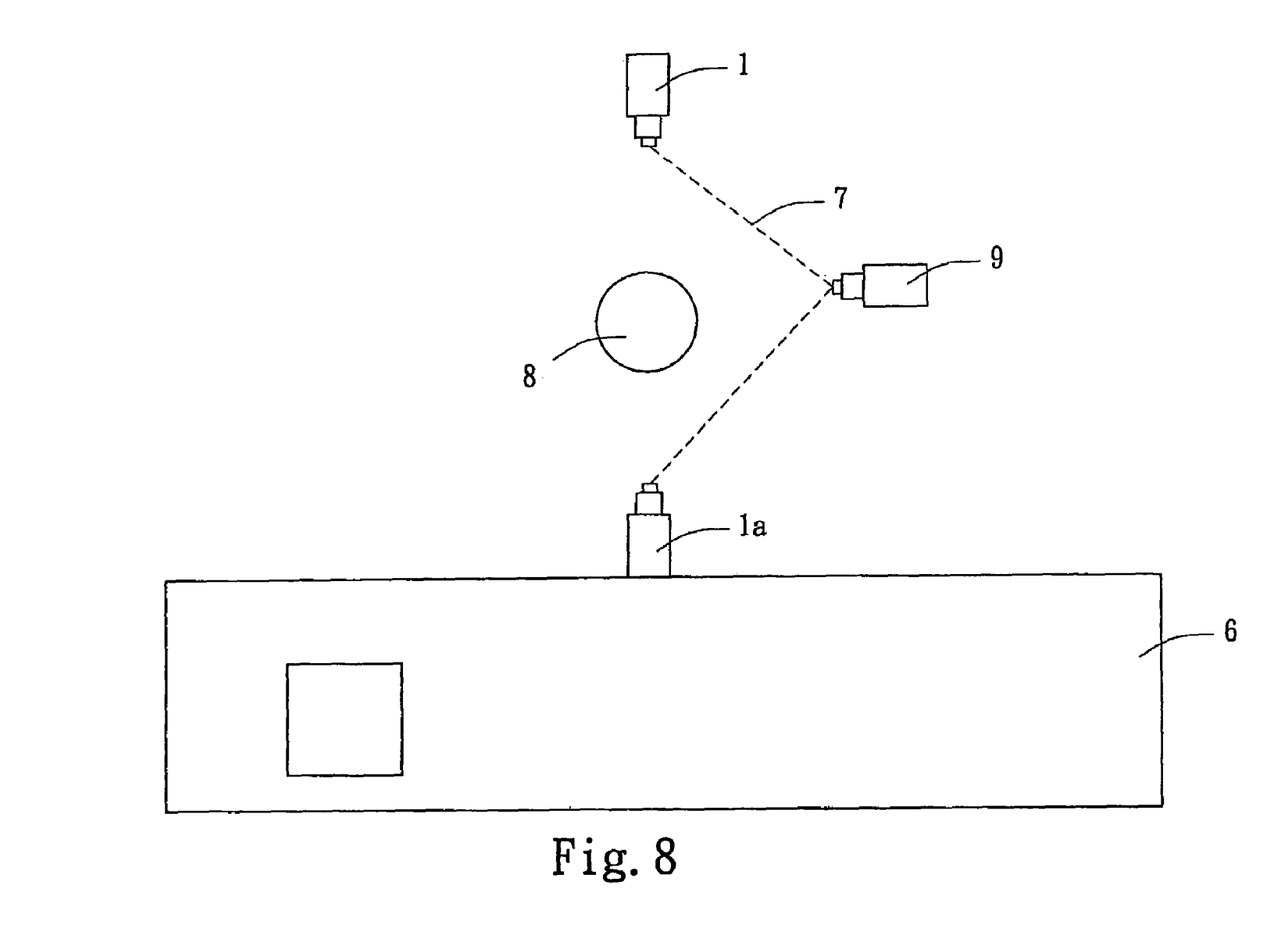
FIG. 8 is a schematic view of a fourth embodiment of the present invention.

Referring to FIG. 8 for a fourth embodiment of the invention. In this embodiment a relay unit 9 is installed between the light transceiver 1 and the light emission device 1*a*. In the event that transmission between the light transceiver 1 and the light emission device 1*a* is interrupted by an obstacle 8 and results in the light 7 generated by the light emission device 1*a* cannot be transmitted to the light transceiver 1, the relay unit 9 can receive the light 7 and project to the light transceiver 1. Thus in the event that dislocation or inclination of the building 6 occurs and the light 7 generated by the light emission device 1*a* cannot be received by the light transceiver 1 through the relay unit 9, the light transceiver 1 will output a signal to the monitor center 3 to alert the condition.

Figure 9:
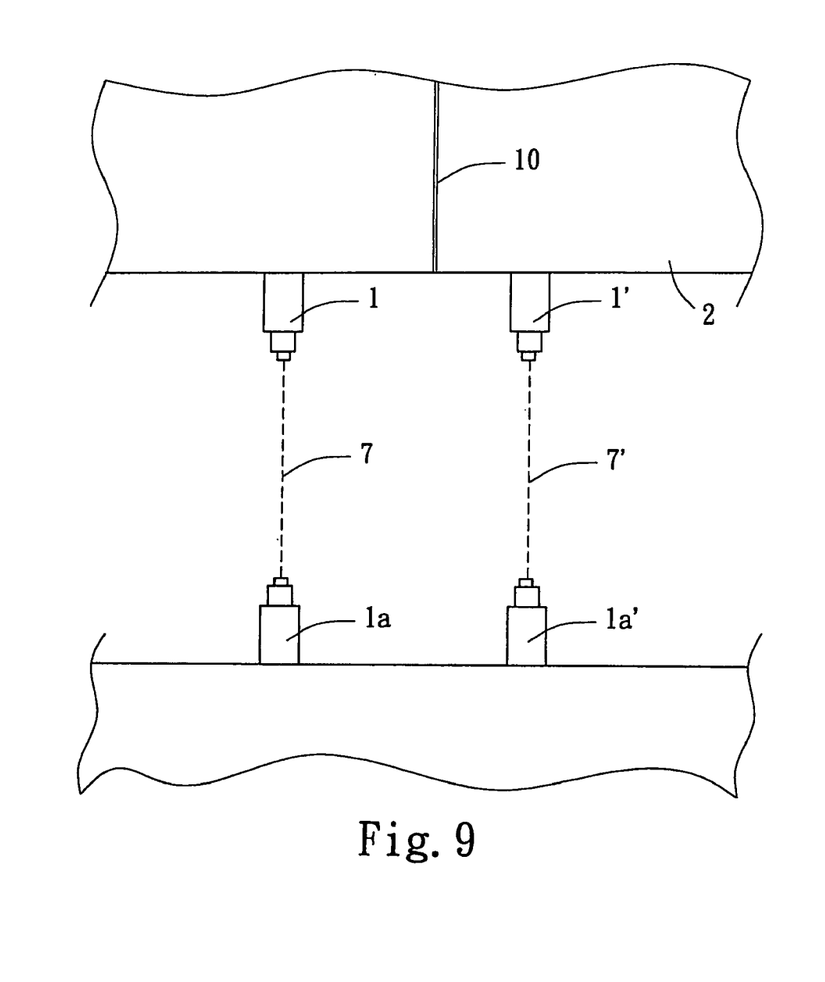
FIG. 9 is a schematic view of a fifth embodiment of the present invention.

Refer to FIG. 9 for a fifth embodiment of the invention. In this embodiment two light transceivers 1 and 1' are installed on two sides of a crevice 10 of the slope 1 and 2, and two light emission devices 1*a* and 1*a*' are installed on selected locations corresponding to the light transceivers 1 and 1' so that the light transceivers 1 and 1' can receive light 7 and 7' emitted from the light emission devices 1*a* and 1*a*'. In the event that dislocation occurs to the crevice 10 and results in either or both of the light transceivers 1 and 1' cannot receive the light 7 and 7' emitted from the light emission devices 1*a* and 1*a*', the relay control modules in the light transceivers 1 and 1' become conductive, and a signal will be generated and sent to the monitor center 3 to inform related organizations regard the dislocation of the crevice 10 and take necessary measures.

Figure 10:
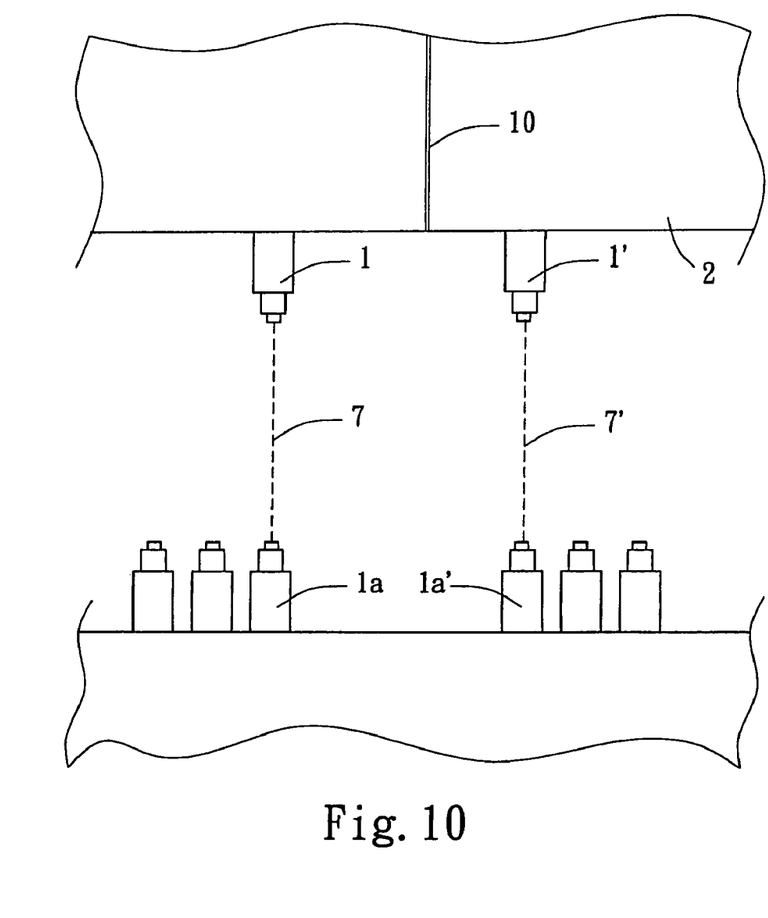
FIG. 10 is a schematic view of a sixth embodiment of the present invention.

Refer to FIG. 10 for a sixth embodiment of the invention. In this embodiment a plurality of light emission devices 1*a* and 1*a*' are installed corresponding to each light transceiver 1 and 1'. The light emission devices 1*a* and 1*a*' are spaced from one another at a constant interval. In the event that dislocation occurs to the crevice 10, according to the light 7 emitted from which of the light emission devices 1*a* and a1' being received by the light transceiver 1 and 1', the size of the dislocation occurred to the crevice 10 may be recorded and determined in the monitor center. In the event that the crevice 10 exceeds the standard, alert will be sent to related organizations to take necessary measures.

Figure 11:
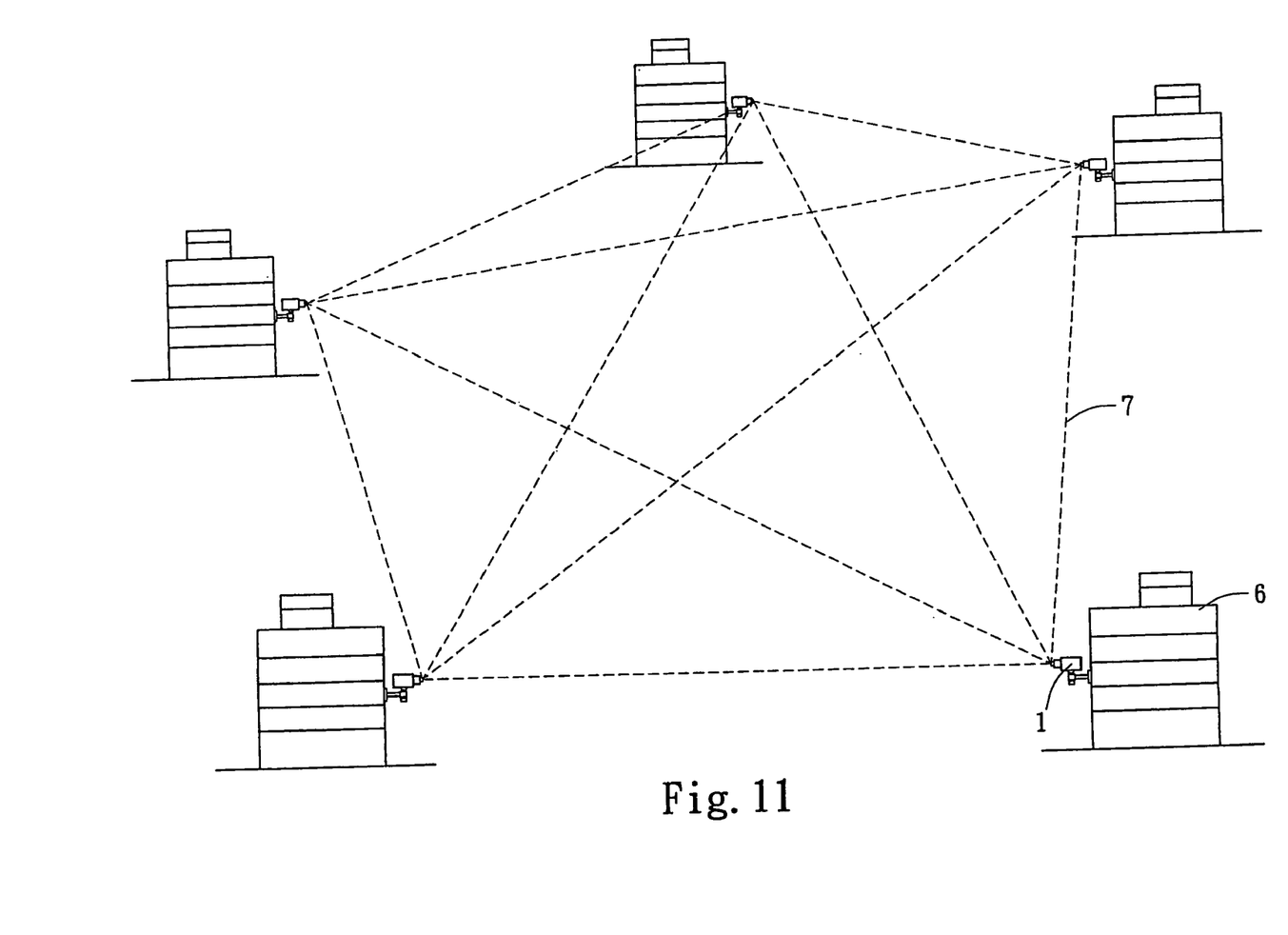
FIG. 11 is a schematic view of a seventh embodiment of the present invention.

Refer to FIG. 11 for a seventh embodiment of the invention. In the event that buildings 6 on the slope land are located in a matrix or irregular network (cobweb) manner, each building 6 may have at least one light transceiver 1 and one relay unit 9 installed thereon so that the monitor center can simultaneously monitor the conditions of each building 6 to ensure the safety of each building. The interconnection monitoring network thus formed also can prevent the false signal and false alarm caused by casual interruption of light transmission.

By means of the invention set forth above, the light transceiver 1 and light emission device 1*a* may be installed and located in various configurations to detect different types of slope lands or landslide areas, and to replace the conventional monitoring equipment such as the building gradient tray, landslide meter, gradient observation duct, sinking observation spot, and crevice meter installed on the slope land communities and slope land retaining structure. Construction time and cost may be reduced, and installation of the monitoring equipment is easier.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A method for monitoring slope lands and buildings on the slope lands to detect a dislocation or inclination occurred to a slope land, comprising steps of:
   a. installing a light transceiver on the slope land;
   b. installing a light emission device on a location corresponding to the light transceiver; and
   c. projecting light from the light emission device to the light transceiver which receives the light and does not output signals;
   wherein the light transceiver does not receive the light emitted from the light emission device when the dislocation or inclination occurs to the slope land and the light transceiver outputs a signal to alert a monitor center.

2. The method of claim 1, wherein the light transceiver includes:
   a receiving unit to receive light;
   an amplifying unit to receive signals output from the receiving unit;
   a switching unit to receive signals output from the amplifying unit to become conductive; and
   a power unit including a light receiver and a power stabilizing circuit;
   wherein the switching unit is not conductive when the receiving unit receives the light, the switching unit becomes conductive and outputs a signal when the receiving unit does not receive the light.

3. The method of claim 1, wherein the light emission device includes:
   an emission unit to generate and output a light which is a light beam of a selected wavelength or a laser light;
   a receiving unit to receive the light;
   an amplifying unit to receive signals output from the receiving unit;
   a switching unit to receive signals output from the amplifying unit to become conductive; and
   a power unit including a light receiver and a power stabilizing circuit;
   wherein the switching unit is not conductive when the receiving unit receive the light, the switching unit becomes conductive and outputs a signal when the receiving unit does not receive the light.

4. The method of claim 1, wherein the light transceiver transmits the signal to the monitor center through a wired fashion.

5. The method of claim 1, wherein the light transceiver transmits the signal to the monitor center through a wireless fashion.

6. The method of claim 1 further having a relay unit between the light transceiver and the light receiving device to reflect the light projected from the light emission device to another light emission device or activate the another light emission device to project light to the light transceiver.

7. The method of claim 1, wherein the light transceiver includes a face panel which contains a plurality of receiving units arranged in a matrix manner;
   wherein the light generated by the light emission device is projected to the face panel on a coordinate spot and drifts on the face panel when the dislocation or the inclination occurred to the slope land or a building on the slope land, the receiving unit receiving the light and outputting a signal to the monitor center to calculate inclination angle or dislocation amount.

8. A method for monitoring slope lands and buildings on the slope lands to detect dislocation or inclination occurred to a building on a slope land, comprising steps of:
   a. installing a light transceiver on the slope land;
   b. installing a light emission device on the building corresponding to the light transceiver; and
   c. projecting light from the light emission device to the light transceiver which receives the light and does not output signals;
   wherein the light transceiver does not receive the light emitted from the light emission device when the dislocation or inclination occurs to the building and the light transceiver outputs a signal to alert a monitor center.

9. The method of claim 8, wherein the building has at least one light emission device installed thereon, each light emission device projecting the light to the light transceiver so that an automatic inspection of other line communication is performed when the light emitted by any one of the light emission device is blocked from reaching the light transceiver thereby to determine environmental conditions and avoid sending out a false alarm signal.

10. A method for monitoring slope lands and buildings on the slope lands to detect dislocation or inclination occurred to a connection location or a crevice of a slope land, comprising steps of:
   a. installing at least two light transceivers on two sides of the connection location of the slope land;
   b. installing at least two light emission devices corresponding to the light transceivers; and
   c. projecting lights from the light emission devices to the light transceiver which receive the lights and do not output signals;
   wherein the light transceivers do not receive the lights emitted from the light emission devices when the dislocation occurs to the connection location and the light transceivers output a signal to alert a monitor center.

* * * * *